E. W. MILLER.
STARCH PREPARING APPARATUS.
APPLICATION FILED AUG. 21, 1916.
1,418,320.
Patented June 6, 1922.
5 SHEETS—SHEET 3.
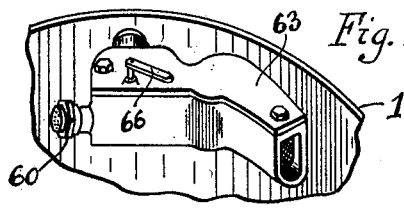
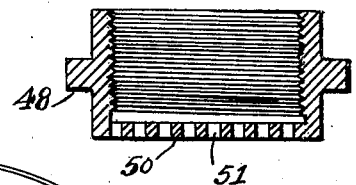
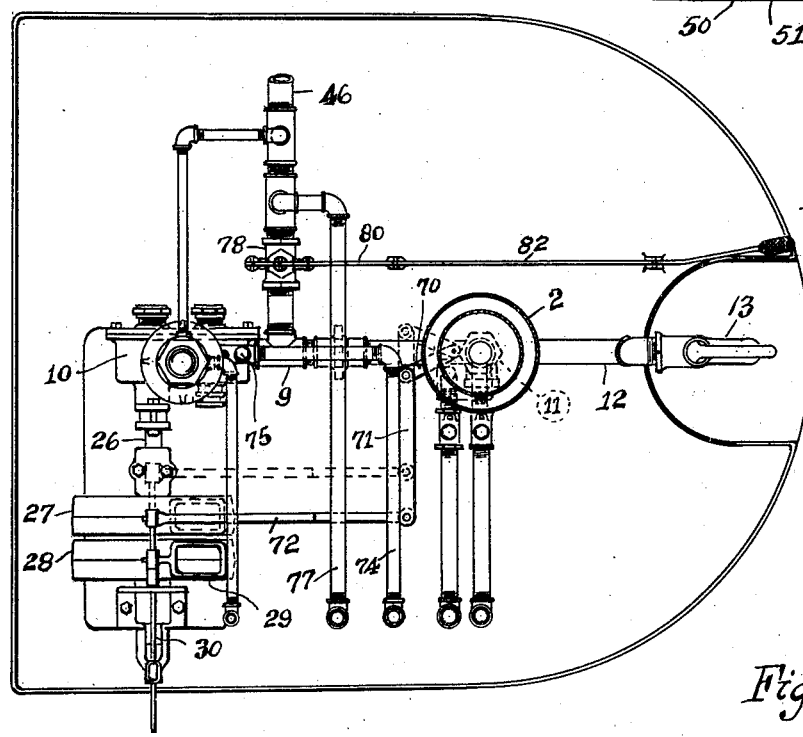
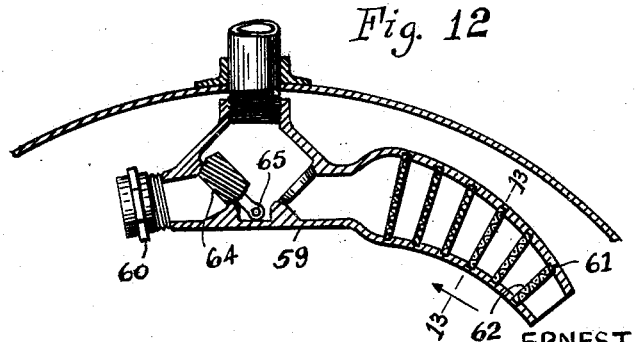
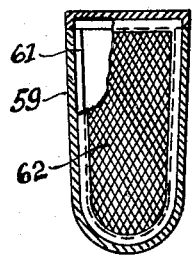
ERNEST W. MILLER INVENTOR.
WITNESSES:
BY Brockett and Hyde
ATTORNEYS.

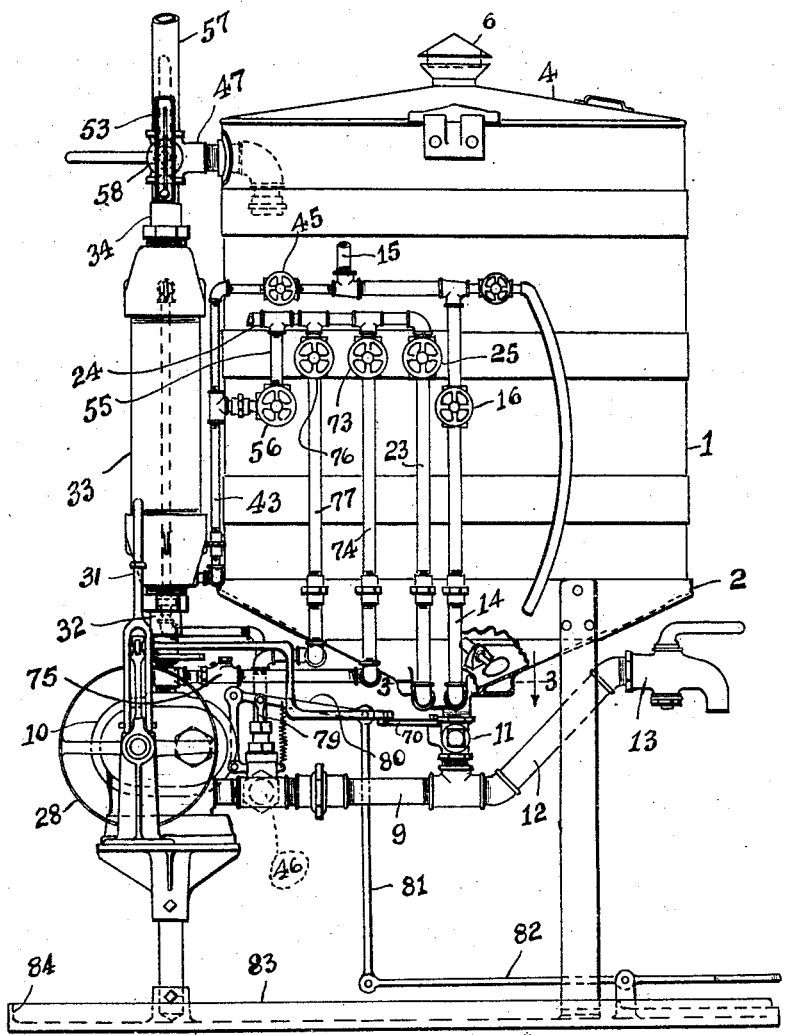

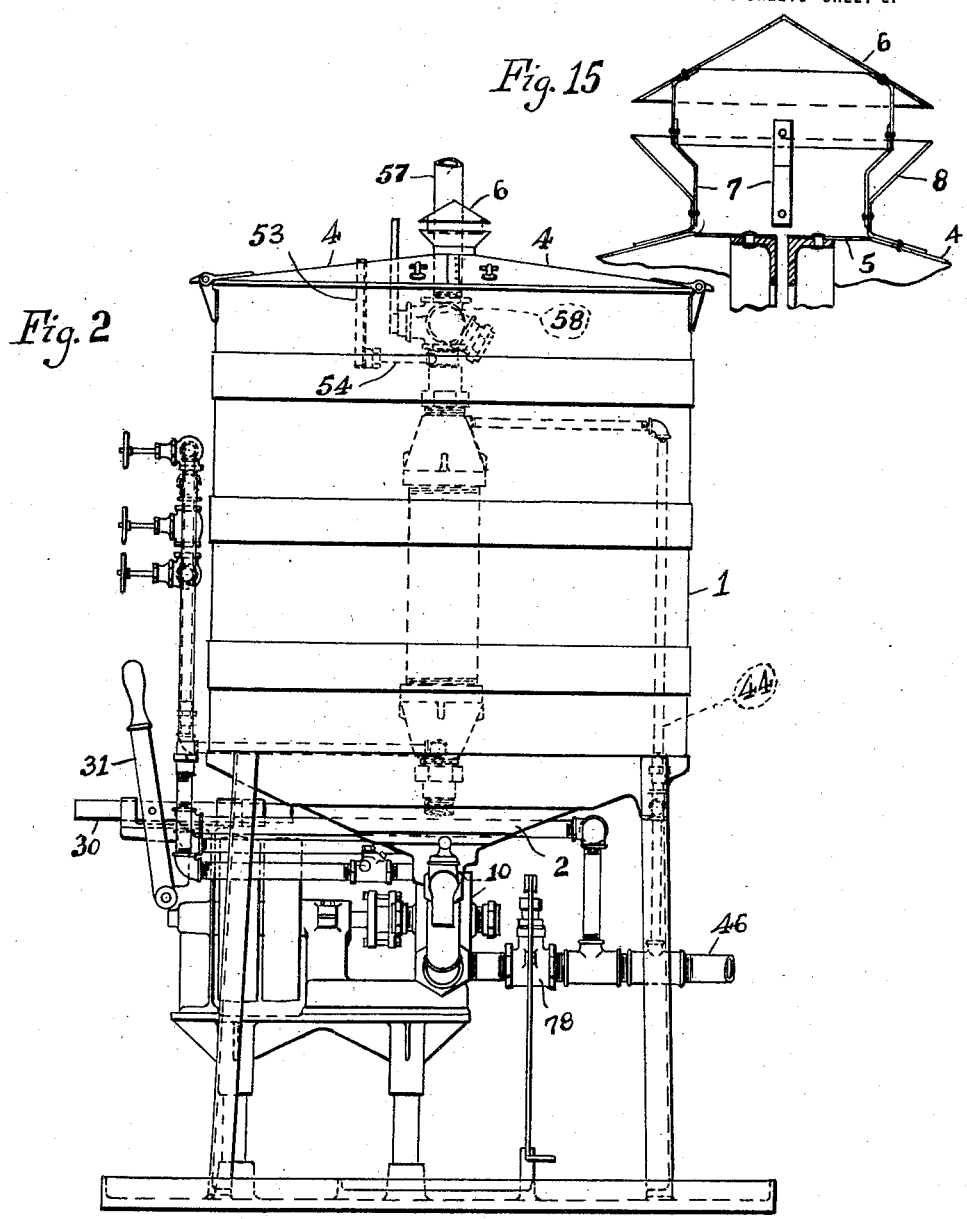

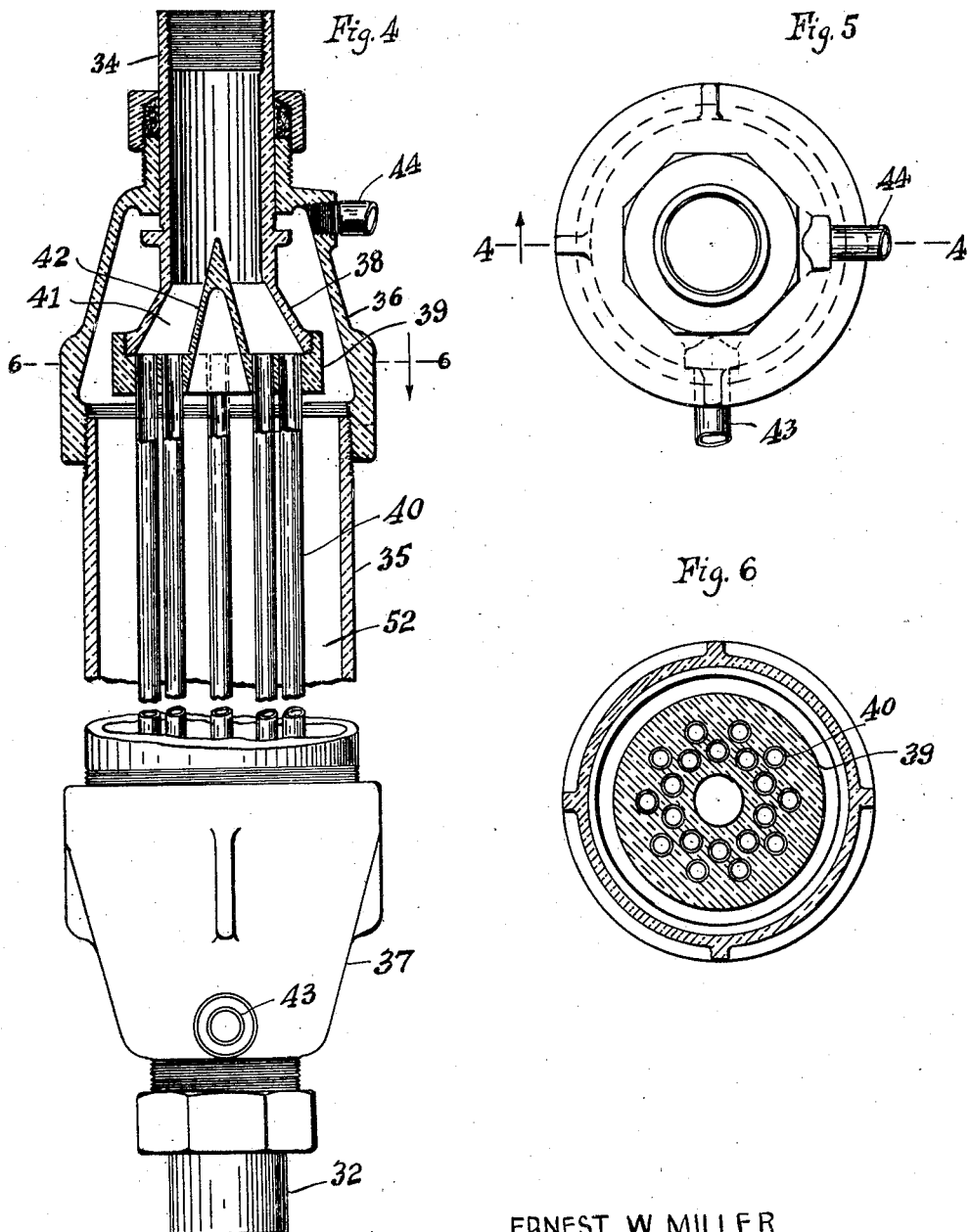

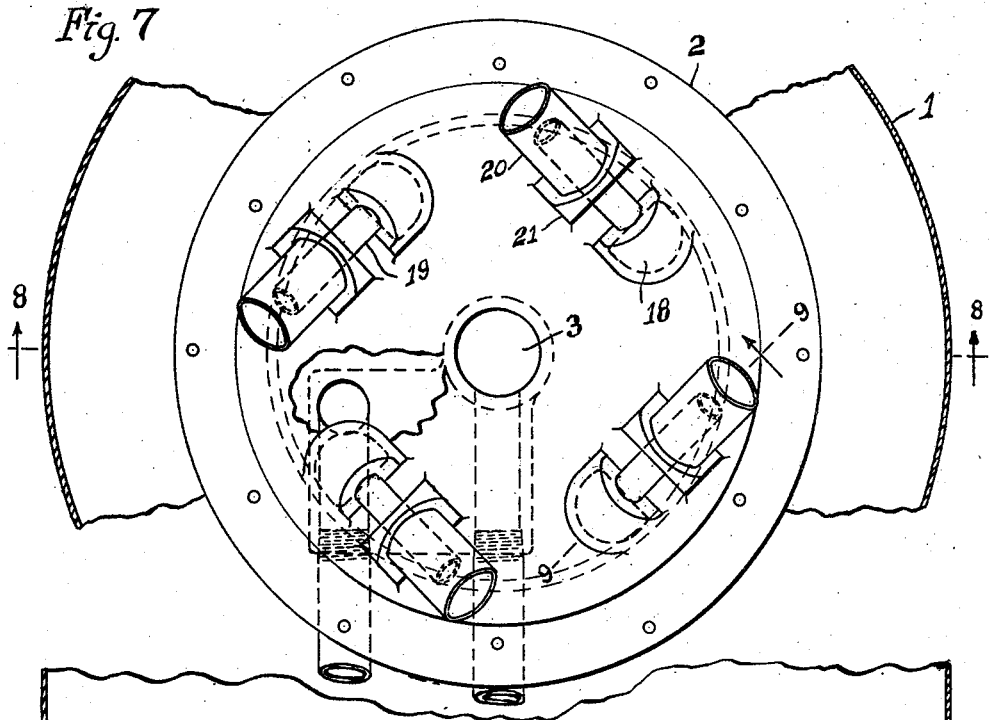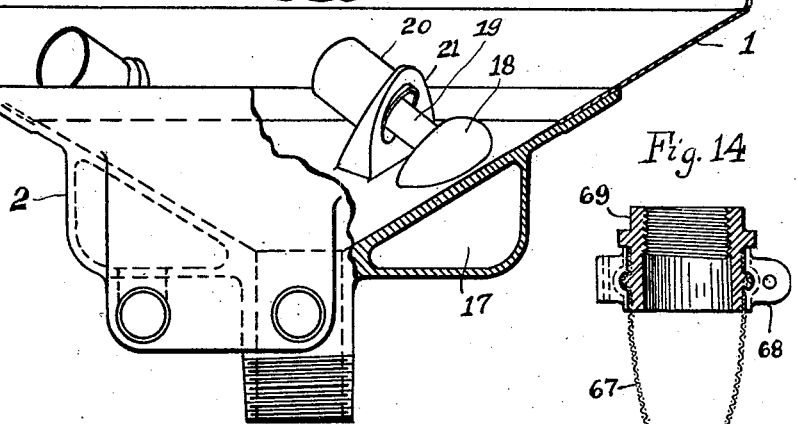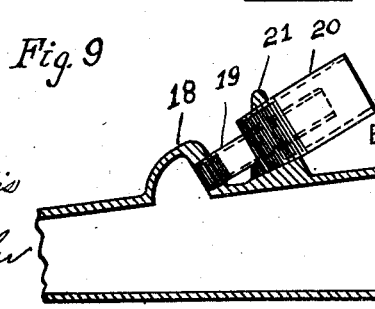

UNITED STATES PATENT OFFICE.

ERNEST W. MILLER, OF CINCINNATI, OHIO, ASSIGNOR TO THE AMERICAN LAUNDRY MACHINERY COMPANY, OF CINCINNATI, OHIO, A CORPORATION OF OHIO.

STARCH-PREPARING APPARATUS.

1,418,320.     Specification of Letters Patent.     Patented June 6, 1922.

Application filed August 21, 1916. Serial No. 116,074.

*To all whom it may concern:*

Be it known that I, ERNEST W. MILLER, a subject of the King of Sweden, residing at Cincinnati, in the county of Hamilton and State of Ohio, have invented certain new and useful Improvements in Starch-Preparing Apparatus, of which the following is a specification.

This invention relates to starch preparing apparatus, and more particularly to apparatus for cooking, cooling and mixing starch for use in laundry work.

One common starching mixture used in laundries consists of a physical mixture of uncooked starch granules held in suspension in a solution of cooked starch. The mixture must be as thorough and complete as possible, because the uncooked starch must be in suspension, and must be constantly agitated to keep it homogeneous. Experience has shown that the starching effect obtained with such a mixture varies rapidly and widely with the viscosity of the mass, which in turn varies with its temperature. Most forms of apparatus now in use for preparing the starch mixture are incapable of maintaining it in the proper condition for obtaining the best results. If the temperature is allowed to go too high the uncooked starch may become cooked; if the mass is not thoroughly agitated it may cook in lumps or solid masses and not "cream" up to the proper consistency; and if the temperature is not maintained at the proper point the viscosity may be either too high or too low, and in either event the starch will not penetrate the goods or produce the desired effects.

The object of this invention is to provide new and improved apparatus wherein the starch may be thoroughly cooked without liability of forming lumps or solid masses, and in a manner to produce a complete, thorough and homogeneous mixture; wherein the starch mixture, including the uncooked starch added to the initial starch solution may be thoroughly "creamed" to the proper consistency; and wherein the final product may be cooled to, and may be maintained within fairly close limits at the proper temperature for securing the best results as to penetration of the goods, etc.

Further objects of the invention are in part obvious and in part will appear more in detail hereinafter.

The invention comprises the starch handling apparatus hereinafter described and claimed.

In the drawings, Fig. 1 is a side elevation, partly broken out and in section, of one form of apparatus embodying the invention: Fig. 2 is a front elevation thereof; Fig. 3 is in part a plan view and in part a sectional view on the line 3—3, Fig. 1; Fig. 4 is an elevation on a larger scale, partly in section on the line 4—4, Fig. 5, and illustrating the temperature regulating device; Fig. 5 is a plan view thereof; Fig. 6 is a cross section on the line 6—6, Fig. 4; Fig. 7 is a plan view of the bottom of the mixing chamber, and illustrating the steam injectors therein; Fig. 8 is an elevation thereof, partly in section on the line 8—8, Fig. 7; Fig. 9 is a detail section on the line 9—9, Fig. 7; Fig. 10 is a detail section of a spraying device; Fig. 11 is a perspective view, from the inside, of the upper portion of the mixing tank, and showing a modified form of spraying device; Fig. 12 is a horizontal sectional view thereof; Fig. 13 is a section on the line 13—13, Fig. 12; Fig. 14 is a detail section, showing another form of spraying and straining device; and Fig. 15 is a detail sectional view, on a larger scale, and illustrating the vent cap for the mixing chamber.

The apparatus shown in the drawings comprises a suitable tank or reservoir 1, which may be of any suitable form or shape, and is shown as a large cylindrical sheet metal tank having a hopper bottom 2 whose walls converge toward a central opening 3, and whose top is closed by a cover consisting of two members 4 hinged to the side walls of the tank. The adjacent edges of the cover members are cut out to form a vent opening 5, and one of said members has riveted or otherwise secured thereto a suitable vent cap, through which steam inside the reservoir may escape, but which prevents loss of the starch mixture by splashing or spattering. In the form shown the vent cap comprises an inverted conical member 6 supported by bars 7 above a funnel-shaped member 8. Any steam arising from the mixture in the vessel passes out between the bars 7 and between the cones 6 and 8, but should any mixture be splashed upwardly into said cap it drains back again into the reservoir.

The bottom central opening 3 of the reservoir communicates with two pipes the first of which, marked 9, is connected to the suction side of a suitable pump 10. In said pipe is a valve 11, and beyond said valve is a branch 12 terminating in a hand-regulated valve or faucet 13. By opening the valve 11, the mixture may be withdrawn by the pump from the bottom of the reservoir 1, and by opening faucet 13 may be discharged into a pail, or both, as will be readily understood. The second pipe communicating with the opening 3, marked 14, is connected to a source of water supply, such as the conduit 15 or the like, and is provided with a controlling valve 16.

The opening 3 at the bottom of the tank is in a heavy metal casting illustrated more particularly in Figs. 7 and 8. Said casting is cored out to form an annular chamber 17 whose upper wall is provided with hollow bosses 18 into which are threaded a series of injector nozzles 19, each of which has its outer end entering and extending partway through a hollow sleeve or tube 20 carried by a boss 21 of the casting. The chamber 17 also communicates by a hollow passage with a pipe 23 leading to a source of steam supply, such as the conduit 24, and in said pipe 23 is a valve 25. When said valve is opened, steam flows into the chamber 17 and is distributed to and discharged through the several nozzles 19 whose outer ends are within the tubes 20, the latter being open at both ends. This arrangement produces an injector action at each nozzle, so that any fluid mixture in the reservoir will be sucked into the back ends of the tubes 20 and forced out of their front ends. As the several nozzles 19 are spaced uniformly around the vertical axis of the reservoir and are disposed substantially tangentially to its circumference, and are also inclined upwardly therein, said nozzles produce a thorough circulation of the mixture in the reservoir, giving it a swirling upward movement along the inner wall of the reservoir with a corresponding downward movement of the mixture along the reservoir axis to take the place of that forced upwardly.

The apparatus described to this point is used for cooking the starch mixture. The starch is either first mixed with water or is introduced in pulverized form into the reservoir to which is also supplied, by way of the pipe 14, the proper quantity of water for the mixture. The steam supply is then turned on and thoroughly circulates the starch mixture in the reservoir and cooks the starch granules, causing them to expand and produce the starch solution, as will be readily understood. By gradually adding the starch to the rapidly circulating hot water the starch may be cooked without the formation of lumps or solid masses.

The pump 10 may be of any suitable form and driven by any suitable motor, such as an electric motor, and is illustrated as a rotary centrifugal pump whose shaft 26 is provided with loose and fast belt pulleys 27, 28, above which is a belt shifter 29 on a sliding bar 30 actuated by a hand lever 31. The discharge end of said pump communicates by a pipe 32 with the bottom of a temperature correcting device 33, illustrated in Figs. 4, 5 and 6, and having an outlet pipe 34 at its upper end. The upper and lower ends of said temperature correcting device are of identical form. It comprises an outer casing 35, shown as a tube threaded at its opposite ends into a cap 36 and base 37 sleeved upon the pipes 32 and 34, whose inner ends are flared, as at 38, and threaded into heads 39, said heads being provided with a number of openings to receive a series of circumferentially spaced longitudinal pipes or tubes 40, establishing communication between the chambers 41 in the opposite ends of the tubes 32, 34. Each head is further provided with a hollow conical extension 42 extending toward the adjacent pipe 32 or 34, as the case may be. The base 37 and cap 36 are also provided with side openings into which are threaded laterally extending pipes 43, 44, of which the pipe 43 communicates by way of a valve 45 with the water supply pipe 15, while pipe 44 communicates (see Fig. 2), with a drain pipe 46 leading to the sewer, and which drain pipe also communicates with the pipe 9, as shown in Fig. 1. The outlet pipe 34 from the temperature correcting device has two branches, one of which, marked 47, passes in through the wall of the tank and terminates in a suitable screening or beating device, several forms of which are shown in the drawings. One form, illustrated in Fig. 10, is a hollow cap 48 threaded onto the end of the pipe 47 and having an end wall 50 provided with a large number of small ports or openings 51 therein.

When the starch solution has been thoroughly cooked and mixed, as before described, the steam supply through the pipe 23 is turned off, the water supply to the hollow chamber 52 in the temperature correcting device around the pipes 40 is turned on, and the pump 10 is started. The solution in the tank 1 is therefore circulated or bypassed through the tubes 40 of the temperature correcting device, and the cold water circulated around said pipes cools down the solution. When said solution is cool enough so that it will no longer cook the starch, say at a temperature of about 130° Fahrenheit, the uncooked starch for the mixture is introduced into the top of the reservoir 1. The mixture is then circulated from the tank 1 to the temperature correcting device 3 and back again for some length of time, to "cream" the mixture and give it the desired consistency. During all of this time the temperature of the mixture is maintained closely at the desired point, which may be determined by a thermometer 53 in a branch pipe 54 communicating with the outlet pipe from the temperature correcting device. Should the temperature get too low the water supply to the chamber 52 may be turned off and steam circulated through said chamber and around the pipes 40 from a steam pipe 55 communicating with the steam supply pipe 24 and connected by way of a valve 56 to the pipe 43, as shown in Fig. 1. This arrangement enables the temperature of the mixture to be maintained within very narrow limits and by beating the mixture in the tank and circulating it through the apparatus, it can be "creamed" to a fine consistency.

The second branch of the outlet pipe 34 of the temperature correcting device, marked 57, may lead to a starching tank or machine in which the goods to be starched are subjected to the starch solution, and the mixture circulating through the pump may be discharged either into the reservoir 1 or to said starching machine, by turning a two-way valve 58 to the proper position.

The nozzle 48, as shown in Fig. 10, merely sprays the mixture into the mixing tank 1. By setting the axis of said nozzle at an incline, as shown in Fig. 2, the mixture may also be given a swirling movement.

Figs. 11, 12 and 13 illustrate a modified form of nozzle for the end of the delivery pipe through which the mixture is discharged into the mixing tank. Said nozzle comprises a hollow casing 59, of Y form. One of the legs of the Y terminates in a nozzle 60 of the same form shown in Fig. 10, while the other leg is provided on its inner surface with a series of grooves or channels 61 to receive a series of screens 62, held in place by a cap or cover 63. At the crotch of the Y is located a valve member 64, turning with a shaft 65 extending outside of the casing 59 and there provided with an operating handle 66. By turning said valve to one position or the other, mixture can be discharged either through the nozzle 60 or through the series of screens 62. These screens filter the mixture and are useful in mixing the cooked starch before the uncooked starch is added thereto, so as to remove any lumps or masses which may have formed therein. The same result may be secured by the straining device illustrated in Fig. 14, which is a cloth or fabric bag 67 secured by a clamping ring 68 to a fitting 69 secured to the end of the pipe 47.

The apparatus is preferably so arranged as to prevent the withdrawal of any material from the bottom of the reservoir 1 except when the pump is operated, thereby insuring a homogeneous and uniform mixture. For this purpose the valve 11 in the pipe leading to the pump or to the faucet 13 is provided with an operating lever 70 connected by a link 71 to an arm 72 fastened to the belt shifting bar 30. When the belt shifter is in one position, say the position shown in dotted lines in Fig. 3, the pump is operating and valve 11 is open, while when the belt shifter is moved to its other position, shown in dotted lines in Fig. 3, the pump is stationary and the valve 11 is closed.

The apparatus is preferably also self-cleaning and draining. For example, the steam supply pipe 24 is connected by way of a valve 73 and pipe 74 to the pipe 32 leading into the bottom of the temperature regulating device. In the pipe 74 is a non-return check valve 75 seated away from the pipe 32. By opening valve 73 steam may be introduced into the bottom of the temperature correcting device for the purpose of blowing and cleaning out the starch line and pipes and tubes in the temperature correcting device. The steam supply pipe 24 also communicates by way of a valve 76 and pipe 77 with the drain tube 46, so that any water of condensation in the steam pipes may be conveyed to the drain and not circulated through the apparatus. The drain pipe 46 is also provided with a suitable valve 78 whose stem 79 (Fig. 1) is connected by a lever 80 and link 81 to a suitable operating device, such as the foot treadle 82. By opening the valve 11 and depressing the treadle 82 the entire mass or mixture in the reservoir 1 may be discharged into the sewer.

The entire apparatus is supported by suitable legs upon a base 83, which is preferably a flat metal member with a peripheral rim or wall 84 forming a shallow tray to receive mixture from the apparatus.

The apparatus is of simple form and enables the operator to readily control the consistency and temperature of the starch mixture within very close limits, and therefore to secure the best results in the starching operation.

What I claim is:—

1. Apparatus for preparing starch, comprising a reservoir, a temperature correcting device, a pump for circulating the starch mixture from the reservoir to said device and back again, a valve controlling the flow of mixture to said pump, means for starting and stopping said pump, and valve controlling means operating conjointly therewith.

2. Apparatus for preparing starch, comprising a reservoir, means for introducing steam to the lower portion of said reservoir in a manner to produce a whirling movement of the starch mixture therein, means for cooling the mixture and means for withdrawing the mixture from the lower portion of said reservoir and reintroducing it into the upper portion thereof.

3. Apparatus for preparing starch, comprising a reservoir, a series of circumferentially extending nozzles projecting into the lower portion of said reservoir and communicating with a steam supply, and hollow sleeves surrounding the ends of said nozzles and open at both ends and cooperating with said nozzles to produce an injector action, thereby to produce a whirling movement of the starch mixture in said reservoir.

4. Apparatus for preparing starch, comprising a reservoir, a series of steam injectors communicating with the lower portion of said reservoir and arranged to produce whirling movement of the starch mixture therein, and a temperature correcting device also communicating with said reservoir and to which the mixture is conducted therefrom.

5. Apparatus for preparing starch, comprising a reservoir, a series of steam injectors communicating with the lower portion of said reservoir and arranged to produce a whirling movement of the starch mixture therein, a temperature correcting device also communicating with said reservoir and to which the mixture is conducted therefrom, a spray nozzle leading into said reservoir, and means for conducting said mixture from said temperature correcting device to said nozzle.

6. Apparatus for preparing starch, comprising a reservoir, a temperature regulator, a pump for circulating the starch mixture from the reservoir to the regulator and back again, a valve controlling the flow of mixture to said pump, and means whereby said valve is opened and closed simultaneously with the starting and stopping of the pump.

7. In starch preparing apparatus, a reservoir for holding the mixture, a conduit for supplying mixture thereto, and an outlet for said conduit, comprising a hollow body connected thereto and having two chambers, a spray nozzle at the outlet from one of said chambers, screening means in the other chamber, and a valve controlling communication of said chambers with the conduit.

In testimony whereof I affix my signature.

ERNEST W. MILLER.

Witnesses:
 Jos. H. Speller,
 R. L. Menzel.